(12) United States Patent
Sewill

(10) Patent No.: US 6,183,533 B1
(45) Date of Patent: Feb. 6, 2001

(54) METHOD FOR REMOVING MERCURY FROM LAMP PARTS

(76) Inventor: Dennis Sewill, 16080 N. Enchanted Dr. Northwest, Andover, MN (US) 55304

(*) Notice: Under 35 U.S.C. 154(b), the term of this patent shall be extended for 0 days.

(21) Appl. No.: 09/153,397

(22) Filed: Sep. 15, 1998

(51) Int. Cl.[7] ............................................. C22B 43/00
(52) U.S. Cl. ............................................. 75/407; 75/670
(58) Field of Search ............................ 75/401, 403, 407, 75/670

(56) References Cited

U.S. PATENT DOCUMENTS

| | | | |
|---|---|---|---|
| 2,593,657 | 4/1952 | Coon et al. | 241/47 |
| 2,620,988 | 12/1952 | Tellier | 241/62 |
| 2,628,036 | 2/1953 | Hall | 241/47 |
| 2,866,604 | 12/1958 | Hall | 241/99 |
| 3,144,876 | 8/1964 | Frye | 137/454.5 |
| 3,233,836 | 2/1966 | Merges | 241/73 |
| 3,614,003 | 10/1971 | Tremolada | 241/79.3 |
| 3,623,672 | 11/1971 | De Frank | 241/36 |
| 3,658,263 | 4/1972 | Zeisler et al. | 241/56 |
| 3,865,319 | 2/1975 | Hofmann | 241/188 |
| 3,913,849 | 10/1975 | Atansoff et al. | 241/55 |
| 3,926,379 | 12/1975 | Dryden et al. | 241/69 |
| 3,938,745 | 2/1976 | Gladwin | 241/99 |
| 4,069,979 | 1/1978 | Morita et al. | 241/5 |
| 4,480,797 | 11/1984 | Weiss | 241/65 |
| 4,494,564 | 1/1985 | Lukacz | 137/527.6 |
| 4,545,540 | 10/1985 | Nakamura | 241/99 |
| 4,579,287 | 4/1986 | Brown | 241/36 |
| 4,607,798 | 8/1986 | Odlin | 241/99 |
| 4,618,103 | 10/1986 | Wilson et al. | 241/41 |
| 4,635,860 | 1/1987 | Kruyer | 241/23 |
| 4,655,404 | 4/1987 | Deklerow | 241/99 |
| 4,858,833 | 8/1989 | Hanulik | 241/24 |
| 5,042,724 | 8/1991 | Perry | 241/19 |
| 5,062,601 | 11/1991 | Graf | 241/79.3 |
| 5,092,527 | 3/1992 | Perry et al. | 241/19 |
| 5,106,598 | 4/1992 | Cogar | 423/99 |
| 5,205,497 | 4/1993 | Deklerow | 241/36 |
| 5,226,606 | 7/1993 | Jasperson et al. | 241/99 |
| 5,454,519 | 10/1995 | Luck | 241/24 |
| 5,492,278 | 2/1996 | Raboin | 241/57 |
| 5,567,223 | * 10/1996 | Lindgren et al. | 75/401 |

FOREIGN PATENT DOCUMENTS

| | | | |
|---|---|---|---|
| 51-9024 | * 1/1976 | (JP) | 75/670 |

* cited by examiner

*Primary Examiner*—Melvyn Andrews
(74) *Attorney, Agent, or Firm*—Crompton, Seager & Tufte, LLC

(57) ABSTRACT

A secondary lamp glass and/or parts processor for removing mercury from recycled lamp parts. The device includes a housing defining a heating chamber. A heater is connected to the heating chamber to heat the lamp glass and retort the mercury on the lamp parts. A hopper is disposed adjacent the heating chamber. The hopper can be disposed proximate the heating chamber such that the heat from the heating chamber can be transferred to the hopper. The hopper can be connected to the heating chamber such that parts from the hopper can be fed into the chamber. A blower fluidly connected to the chamber and the hopper forces air through the chamber and into the hopper as parts are fed into the chamber from the hopper.

12 Claims, 1 Drawing Sheet

METHOD FOR REMOVING MERCURY FROM LAMP PARTS

BACKGROUND OF THE INVENTION

The present invention pertains to the field of removing residual mercury from recycled lamp parts, and, in particular, lamp glass.

Currently, recyclers of mercury-containing lamps produce a glass bi-product with residual mercury at a level of between about 0.5 parts per million to 4 parts per million. A representative lamp recycling machine is disclosed by Sewill et al., in U.S. Pat. No. 5,683,041, issued Nov. 4, 1997, incorporated herein by reference. The amount of residual mercury can limit the options available for disposal or reuse of the lamp parts and, in particular, lamp glass. The reuse of the lamp glass is particularly limited by the residual mercury levels if the glass is to be reused without remelting.

SUMMARY OF THE INVENTION

The present invention provides a device and method for lowering the residual mercury levels of recycled lamp parts. These parts can include, for example, metal end caps and/or lamp glass. Applicant's invention can be used to substantially reduce the residual mercury levels of the lamp glass below the approximately 0.5 parts per million to 4 parts per million levels after processing through a lamp glass recycler separator such as that disclosed by Sewill et al., in U.S. Pat. No. 5,683,041, issued Nov. 4, 1997. The device and method of the present invention can be used to remove substantially all of the residual mercury from the glass such that levels less than 50 parts per billion can be obtained.

The device in accordance with the present invention preferably includes a housing defining a heating chamber. A heater is connected to the heating chamber. A parts hoppers is preferably disposed adjacent to the heating chamber. The hopper can be disposed proximate the heating chamber such that heat from the chamber can be transferred to the parts in the hopper. The hopper is preferably connected to the heating chamber such that parts from the hopper can be fed into the chamber. A blower is fluidly connected to the heating chamber and the hopper such that air can be forced through the chamber and into the hopper as parts are fed into the chamber from the hopper. The heater preferably heats the interior of the heating chamber to between about 800°–1200° F. to vaporize the mercury such that it can be carried away from the lamp parts by the air forced through the heating chamber by the blower.

The hopper is preferably disposed above the chamber to gravity feed parts from the hopper into the chamber. The blower can assist the heat transfer from the chamber to the hopper by drawing air through the chamber and into the hopper to preheat parts therein. The blower simultaneously forces the air containing evaporated mercury through a filter prior to discharge to the atmosphere. This filter preferably includes a HEPA filter.

In addition to a heating chamber, the device preferably includes a cooling chamber disposed adjacent and below the heating chamber. By disposing the cooling chamber below the heating chamber, parts can be gravity fed from the heating chamber to the cooling chamber. Additionally, residual heat on the lamp parts can rise into the heating chamber to enhance heating efficiency.

DETAILED DESCRIPTION OF THE INVENTION

Figure 1:
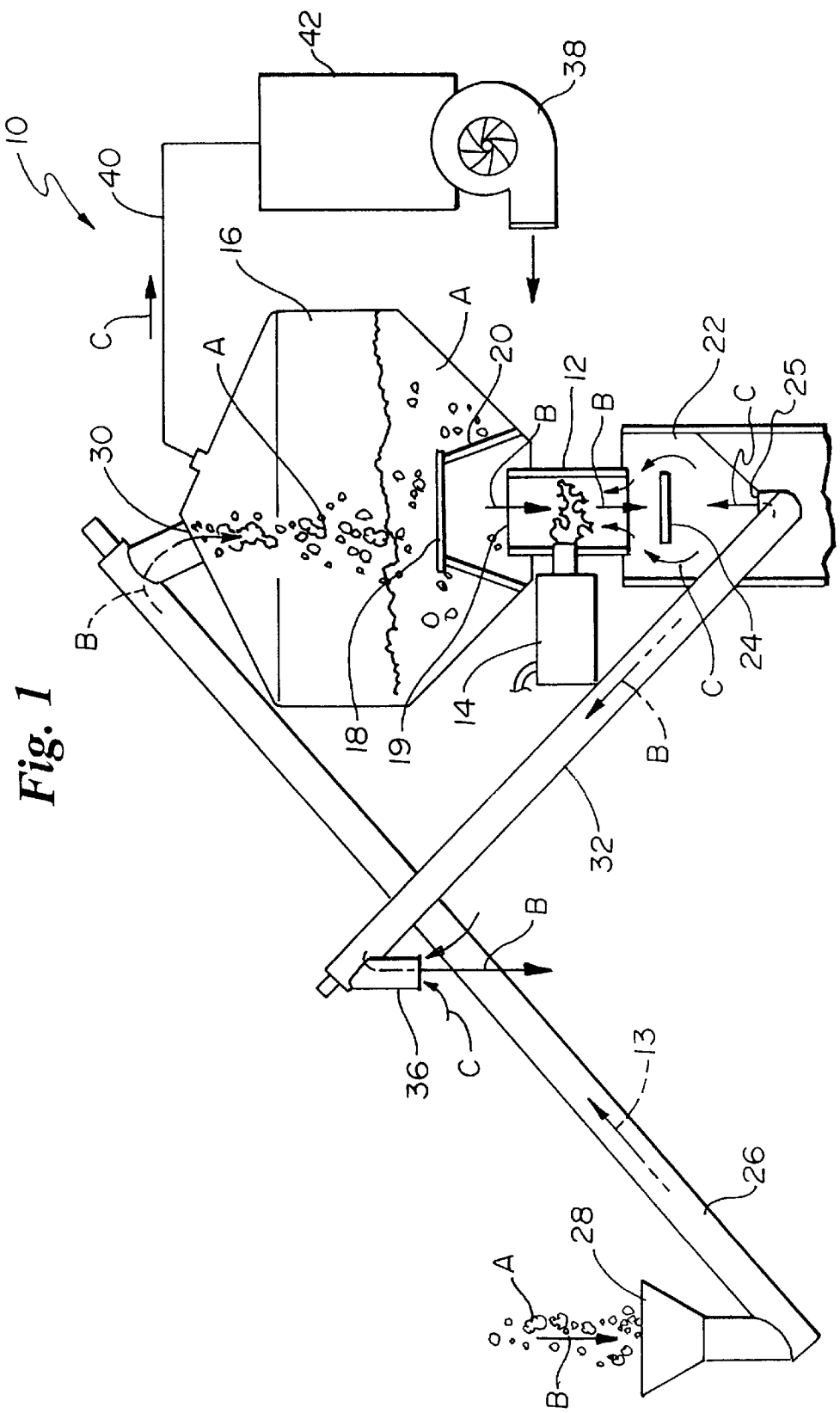
FIG. 1 is a schematic view of a secondary lamp glass processor in accordance with the present invention.

Referring now to the drawing, FIG. 1 is a schematic view of a preferred embodiment of a secondary lamp processing device in accordance with the present invention. Device 10 includes a housing 12 defining a heating chamber. A heater 14 provides heat to chamber 12. Chamber 12 is preferably insulated to limit heat loss to the atmosphere. Heater 14 is preferably able to elevate the internal temperature of chamber 12 to between about 800°–1200° F. or more preferably about 1150° F. for sustained periods.

Fluidly connected to heating chamber 12 is a hopper 16. Hopper 16 is preferably disposed above heating chamber 12 such that lamp parts A can be gravity fed into chamber 12. A baffle plate 18 can be supported over lamp part entry opening 19 into chamber 12 by legs 20. Baffle plate 18 can induce a first in/first out lamp parts flow pattern through hopper 16.

Device 10 also preferably includes a cooling chamber 22. Cooling chamber 22 is preferably disposed below heating chamber 12 to allow lamp parts to be gravity fed from heating chamber 12 into cooling chamber 22. Cooling chamber 22 can include a baffle 24 connected to the walls of chamber 22 above a cooling chamber outlet 25 to induce a first in/first out lamp parts flow pattern through cooling chamber 22.

Lamp parts can be fed into hopper 16 by an feed auger 26 having an inlet 28 and an outlet 30. Outlet 30 preferably includes a sealing gate (not shown) of a type known to those skilled in the art which closes when lamp parts are not being fed into hopper 16. The lamp parts can be removed from cooling chamber 22 by a output auger 32 connected to cooling chamber outlet 25. Output auger 32 includes an outlet 36.

Device 10 also preferably includes a blower 38 fluidly connected to hopper 16 by line 40. Blower 38 is also preferably connected to a filter 42 which preferably includes a HEPA filter.

In use, lamp parts A which can include lamp glass and/or metal end caps are fed through device 10 along the path shown by arrows B. It is anticipated in most applications, that prior to processing through device 10, lamp glass will have been separated from the end caps, and lamp powder including mercury will have been substantially removed by a lamp processing machine such as that devised by Sewill et al., and disclosed in U.S. Pat. No. 5,683,041, issued Nov. 4, 1997.

Lamp parts are fed into feed auger 26 and fall into hopper 16. The lamp parts are preferably gravity fed into heating chamber 12. The lamp parts preferably pass through heating chamber 12 such that each lamp part is usually within the chamber for about 30–90 minutes and, more preferably about 45–75 minutes, while the temperature within the chamber is preferably held at between about 800° F. to 1200° F. or, more preferably, at approximately 1150° F. The glass then flows into cooling chamber 22 and is removed from cooling chamber for subsequent transport by auger 32.

While lamp parts are moving through device 10 along the path indicated by arrows B, blower 38 preferably draws air through device 10 along the path indicated by arrows C. As shown by arrows C, air is drawn through auger 32 and then upwardly through cooling chamber 22, heating chamber 12 and hopper 16. The air passing along the path indicated by C will pick up vaporized mercury, particularly in heating chamber 12, and carry it through a filter 42 prior to discharge to the atmosphere.

It can be appreciated that device 10 can be operated in a continuous fashion. It can also be appreciated that the vertical arrangement of cooling chamber 22, heating chamber 12 and hopper 16 enhances the efficiency of the device. Heat can rise from heating chamber 12 into hopper 16 to preheat lamp parts A. Additionally, as lamp parts are cooled within chamber 22, heat will be transferred upward to heating chamber 12.

Furthermore, the composition of the mass of the glass or lamp parts is such that air passes through gaps formed by the irregular shape of the glass or lamp particles (most of the glass will measure ½ inch, plus or minus ¼ inch, times ½ inch plus or minus ¼ inch times the thickness of the glass). When air is not passed through the mass of the glass or lamp parts, the mass of the glass acts as a very effective insulator. Preferably, the rate of air flow through the glass is sufficient to move heat upward at about the rate glass is moved downward, such that heat is retained within heating chamber 12 and hopper 16. Thus, when operating the device 10 in a continuous fashion, the majority of heat loss is preferably primarily limited to losses through the insulation of heating chamber 12, and the heat remaining in the discharged glass or lamp parts.

As shown in FIG. 1, the cross sectional area of heating chamber 12 transverse to the direction of air flow is substantially smaller than that of hopper 16 and cooling chamber 22. Consequently, the air flow velocity through heating chamber 12 will be greater than through hopper 16 and cooling chamber 22. The higher velocity through heating chamber 12 can sweep mercury from the lamp parts or glass. Additionally, the lower air flow velocity through hopper 16 will tend to reduce the heat transfer out of the mass of glass.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A method for removing mercury from lamp parts, comprising the steps of:

providing a heating chamber;

passing the lamp parts through the heating chamber in a first direction to evaporate the mercury; and passing air through the heating chamber in a second direction different than the first direction to remove the mercury from the heating chamber and lamp parts.

2. The method in accordance with claim 1, further comprising the step of heating the chamber to about 800°–1200° F.

3. The method in accordance with claim 2, wherein the chamber is heated to at least about 1150° F.

4. The method in accordance with claim 1, wherein the lamp parts pass through the chamber in about 30 to 90 minutes.

5. The method in accordance with claim 4, wherein the lamp parts pass through the chamber in between about 45 to 75 minutes.

6. The method in accordance with claim 1, further comprising the step of filtering mercury from substantially all of the air passed through chamber.

7. The method in accordance with claim 1, further comprising the step of passing the air through the heating chamber at a higher velocity than through an associated cooling chamber and hopper.

8. The method in accordance with claim 1, further comprising the steps of: providing a hopper, placing the lamp parts in the hopper, preheating the lamp parts in the hopper prior to passing the lamp parts through the heating chamber.

9. The method in accordance with claim 8, further comprising the step of: preheating the lamp parts at least in part by the air passed through the heating chamber.

10. The method in accordance with claim 8, further comprising the steps of: placing the hopper generally above the heating chamber, and feeding the lamp parts into the heating chamber from the hopper at least in part by gravity.

11. The method in accordance with claim 8, further comprising the step of: providing a blower to draw air from the heating chamber generally upwardly through the lamp parts in the hopper.

12. The method in accordance with claim 8, further comprising the steps of: providing a cooling chamber in fluid communication with the heating chamber, moving the lamp parts from the heating chamber to the cooling chamber and drawing heat from the lamp parts into the heating chamber.

* * * * *